No. 845,327. PATENTED FEB. 26, 1907.
G. W. BELL.
PNEUMATIC CUSHIONING WHEEL SUPPORT.
APPLICATION FILED FEB. 12, 1906.
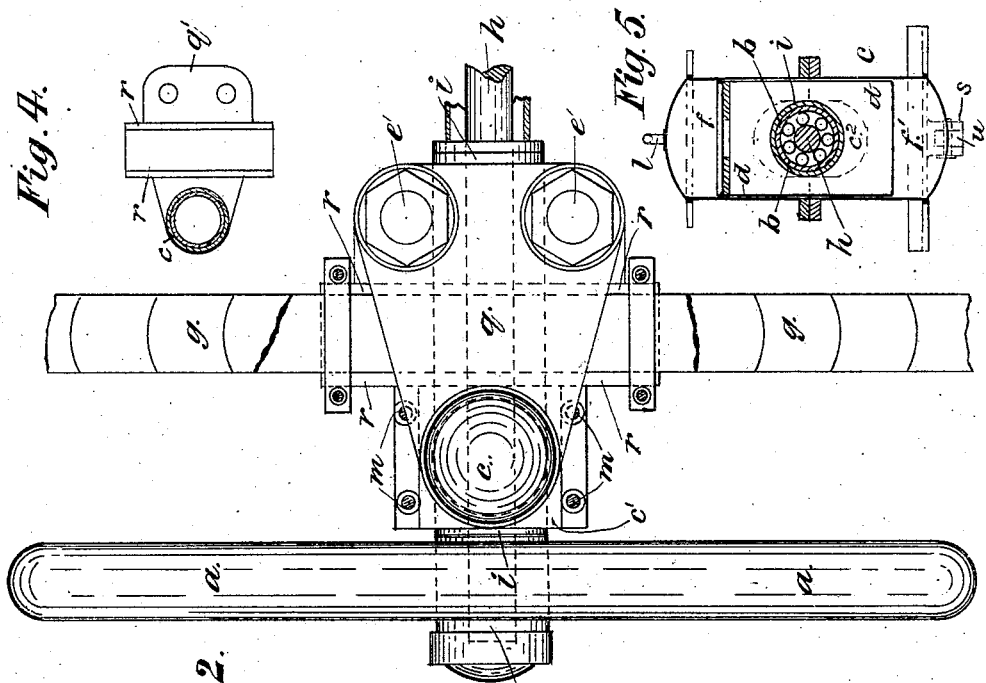
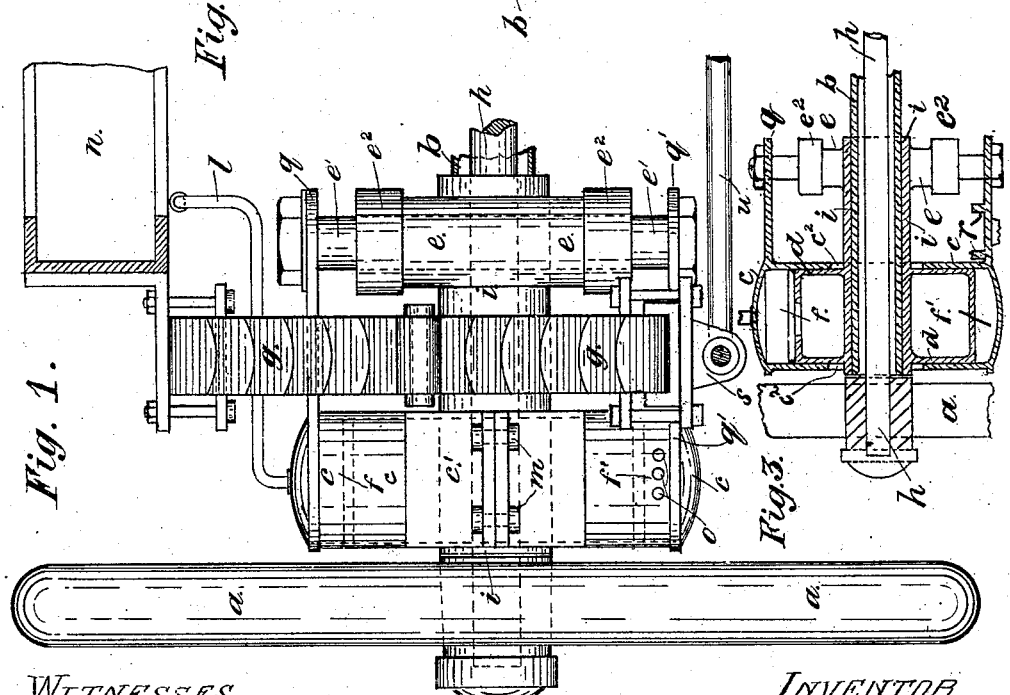
WITNESSES.
Thos. D. Longstaff
Oliver C. Barthel
INVENTOR.
George William Bell
By Barthel & Barthel
Attorneys.

UNITED STATES PATENT OFFICE.

GEORGE WILLIAM BELL, OF LIVERPOOL, ENGLAND.

PNEUMATIC CUSHIONING WHEEL-SUPPORT.

No. 845,327. Specification of Letters Patent. Patented Feb. 26, 1907.

Application filed February 12, 1906. Serial No. 300,560.

*To all whom it may concern:*

Be it known that I, GEORGE WILLIAM BELL, a subject of the King of Great Britain and Ireland, residing at Liverpool, in the county of Lancaster, England, have invented certain new and useful Improvements in Pneumatic Cushioning Wheel-Supports, of which the following is a specification, reference being had therein to the accompanying drawings.

The object of this invention is to provide for power-driven vehicles an effective device which permits the substitution of a solid tire for the pneumatic tire by providing effective pneumatic cushioning devices between the axle and the load supported thereon; and the invention consists in the novel construction and arrangement of parts whereby the desired object is obtained in a manner which does not involve any radical departure from the present construction, in which the power is transmitted to the rear wheels through live-spindles inclosed within a hollow rear axle carrying the transmitting-gear, all as more fully hereinafter described, and shown in the accompanying drawings, in which—

Figure 1 is an elevation embodying my invention as applied to the rear axle of an automobile. Fig. 2 is a plan of Fig. 1. Fig. 3 is a vertical section of Fig. 1 on a smaller scale. Fig. 4 is a detached plan of the bracket on the lower end of the cylinder, and Fig. 5 is a vertical central cross-section of the cylinder and piston.

In the drawings, $a$ represents one of the rear drive-wheels provided with a solid tire instead of the usual pneumatic tire.

$h$ is one of the live-spindles forming the rear drive and to which the wheel $a$ is secured in the usual manner to revolve with it, and $b$ is the hollow rear axle in which the live-spindles are journaled and arranged to transmit the power from the motor to the rear wheels in the usual manner.

My invention is embodied in the following device, which, it will be understood, applies to both ends of the axle alike: Upon the end of the hollow axle is fastened an axle casing or sleeve $i$, which is formed with a hollow piston $d$, which extends vertically above and below the sleeve. It is also formed with two vertical guide-bearings $e$, which extend above and below the sleeve on opposite sides thereof. The piston $d$ is wholly inclosed within a cylinder $c$, which extends above and below the piston and forms the closed air-chambers $f$ $f'$ above and below the piston, respectively, the air-chamber $f$ being in communication with the interior of the hollow piston and provided with a supply-pipe $l$ for supplying it with compressed air, while the air-chamber $f'$ communicates with the outer air through openings $o$, controlled by the piston. The cylinder $c$ is free to vertically rise and fall in relation to the piston, and to permit such vertical movement a portion $c'$ of the cylinder is squared or otherwise formed with thickened walls and provided with vertical apertures $c^2$ on opposite sides for the passage of the sleeve $i$ therethrough. The cylinder for convenience is divided in halves upon a horizontal plane, the halves being connected together by bolts $m$ passing through suitable flanges on the halves, and the halves are formed with plate-like brackets $q$ $q'$, one on the upper and the other on the lower end of the cylinder and extending inwardly over the sleeve and over the vertical guide-bearings $e$ far enough to receive the vertical guides $e'$, which rigidly join the inner ends of the brackets together and pass through the guide-bearings $e$. The lower bracket-plate $q'$ is provided with parallel flanges $r$, suitably spaced apart to receive between them a spring $g$, interposed between the body $n$ of the vehicle and the plate $q'$, the spring being bolted to the plate $q'$ in the usual manner. The plate $q'$ is preferably provided upon its under side with ears $s$, adapted to receive one end of a connecting-rod $u$, the other end of which is likewise connected to the corresponding support at the other end of the axle.

In practice it will be understood that the construction is intended to support the load upon an air-cushion formed in the air-chamber $f$ on top of the piston, suitable means being provided to keep the air under constant compression and provide for any leakage which may take place around the piston, the latter being suitably constructed to reduce the leakage to a minimum, and in connection therewith I intend to apply a system of lubrication to the piston and to the guide-bearings $e$ for reducing the friction to a minimum, the guide-bearing $e$ being preferably provided with antifriction-boxes $e^2$ at opposite ends.

The openings $o$ in the normal condition of travel will be closed by the piston; but in case of a violent shock which causes the piston to rise air will be drawn in through the openings and operate as a check or dash-pot on the rebound.

My wheel-supporting device has several advantages. It provides an air-spring of considerable volume, which, while it interposes only between the axle and the body, brings the load to bear upon the axle at a point close to and adjacent to the wheels and permits the use of very flexible elliptical springs, since the available distance for placing the springs is much increased by supporting the spring upon the bracket $q'$.

While I have shown my invention as applied to the rear axle only, it is obvious that in applying it to the front axle the wheels will be connected to the front axle by the usual steering-knuckle instead of to the ends of the drive-spindles.

Having thus fully described my invention, what I claim is—

1. The combination with the axle and its supporting-wheel at one end thereof, of a casing or sleeve upon the axle adjacent to the wheel, a vertical piston at the outer end of said sleeve and extending above and below the sleeve, a cylinder in which said piston works and forms air-chambers above and below it, the one above forming an air-spring for the support of the load and provided with means for supplying it with compressed air, and the one below, having air-ports controlled by the piston, brackets at the opposite ends of the cylinder and extending inwardly above and below the sleeve, vertical guides secured between the inner ends of said brackets, vertical guide-bearings on the sleeve through which said guides pass, and a spring interposed between the lower bracket and the load.

2. In a power-driven vehicle the combination with a hollow rear axle and drive-wheels connected to the ends of live-spindles journaled in the hollow axle, of air-cushioning devices interposed between the ends of the axle and the vehicle-body, each comprising a sleeve fastened upon the axle adjacent to the wheel, a hollow piston on the outer end of the sleeve and extending vertically above and below the same, a cylinder movably inclosing the piston and forming air-cushions above and below the piston, the one above the piston communicating with the interior of the piston and provided with means for supplying it with compressed air, brackets at the upper and lower ends of the cylinder and extending inwardly over the sleeve, vertical guides uniting the inner ends of said brackets, vertical guide-bearings on the sleeve through which the guides pass, and a spring interposed between the lower bracket and the load.

In testimony whereof I affix my signature in presence of two witnesses.

GEORGE WILLIAM BELL.

Witnesses:
OLIVER E. BARTHEL,
OTTO F. BARTHEL.